United States Patent [19]

Vu

[11] Patent Number: 5,844,393
[45] Date of Patent: Dec. 1, 1998

[54] STEPPER DRIVE CONTROL USING VARIABLE STEP ANGLE

[76] Inventor: Hung D. Vu, 88 Pilgrim Rd., Pembroke, Mass. 02359

[21] Appl. No.: 885,078

[22] Filed: Jun. 30, 1997

[51] Int. Cl.$^6$ ....................................................... H02P 8/00
[52] U.S. Cl. ............................................ 318/696; 318/603
[58] Field of Search ..................................... 318/685, 698, 318/600–605, 11–13

[56] References Cited

U.S. PATENT DOCUMENTS

| | | | |
|---|---|---|---|
| 4,568,866 | 2/1986 | Floro et al. ............................... | 318/696 |
| 4,734,847 | 3/1988 | Hunter ..................................... | 364/174 |
| 4,751,445 | 6/1988 | Sakai ....................................... | 318/696 |
| 4,855,660 | 8/1989 | Wright et al. ........................... | 318/696 |
| 4,890,105 | 12/1989 | Bean et al. ............................. | 341/115 |
| 4,910,475 | 3/1990 | Lin .......................................... | 310/49 R |
| 5,650,705 | 7/1997 | Hart ........................................ | 318/635 |
| 5,659,234 | 8/1997 | Cresens .................................. | 318/696 |

*Primary Examiner*—Brian Sircus
*Attorney, Agent, or Firm*—Ira S. Dorman

[57] ABSTRACT

The stepper motor controller, implemented as computer software, converts each input pulse into many internal pulses, which internal pulses are used for calculating a command angle during each sampling time interval of operation. The values of the angle commands may vary, from interval to interval, as a function of the input pulse train rate (i.e., the number of new pulses input per interval). The system accesses an internal look-up table to convert vector data into torque values, for driving the motor; if the input pulse rate is sufficiently high to warrant doing so, the look-up table data can be accessed out of sequence.

25 Claims, 2 Drawing Sheets

STEPPER DRIVE CONTROL USING VARIABLE STEP ANGLE

BACKGROUND OF THE INVENTION

As is well known, stepper motors are designed with various numbers of poles and phases to provide the basic step angle within which the motor can be positioned. The basic step angle is referred to as the "full step"; other step sizes, such as half-steps and microsteps, can be derived from the full step to provide smaller step angle increments.

For example, to complete one revolution in full step mode a typical two-phase 1.8° hybrid stepper motor must index through 200 positions at the full step angle (360°/1.8°). In the half-step (0.9°) mode, the motor must of course index through 400 positions (360°/0.9°) to complete a revolution, and a similarly multiplied number of positions must be indexed for a given microstep selection; thus, a microstep of 1/200 must index through 40,000 positions, and will provide a resolution of 0.009° for each commanded pulse input. It goes without saying that the larger the step-angle-per-pulse input the fewer the number of step pulse commands that will be required for the driver to achieve one motor shaft revolution.

In conventional systems a microstep driver must be employed for applications that require the motor shaft to attain a fractional value of a full step angle. Microstep drivers also provide better smoothness at low speeds; indeed, many applications utilize such a driver primarily to obtain that advantage, with finer positioning being of secondary concern. On the other hand, microstep drivers require the generation of a correspondingly greater number of step pulses from the controller, as a result of which high-speed operation may become a limiting factor.

Considering for example a 1.8° stepper motor that has an operating speed range of to 1800 rpm, the step command frequency required to drive the motor over the full speed range is 6,000 steps per second in the full step mode, and 1,200,000 steps per second in a 1/200 microstep mode. Generating a controllable frequency pulse train exceeding one MHz is in general much more difficult than generating a five kHz frequency; factors entailed in the transmission of high frequency pulse signals must also be taken into consideration and may impose constraints.

Operating a stepper motor in its conventional, full-step mode may involve other disadvantages as well, especially at low speeds. Since a full step entails a fairly large step angle (e.g., 1.8° mechanical), a step transition causes the motor shaft, operating at low speeds, to accelerate at maximum torque from its current position to the next equilibrium position. Due to the open-loop nature of such motors, shaft movement typically overshoots the commanded value in an oscillating manner, often characterized by considerable amplitude and an extended settling time. This property results in very poor low-speed performance due to shaft vibration, and also gives rise to very noisy operation; at system resonant frequencies, moreover, the motor may lose its synchronization and become entirely inoperative at the corresponding speed. Although the foregoing disadvantages can generally be avoided or minimized by use of a microstep driver, associated system design and cost factors may be prohibitive.

SUMMARY OF THE INVENTION

Accordingly, the broad objects of the present invention are to provide a novel method for controlling rotation of a stepper motor shaft with a high level of precision, and a novel controller and motor for implementing the same, which enable the use of relatively low frequency operating pulse trains and require relatively brief settling times between step transitions, and avoid the need for a microstep driver.

More specific objects are to provide such a method, controller, and system by which especially desirable low-speed performance of stepper motors is achieved, and which are readily provided at relatively low cost.

It has now been found that certain of the foregoing and related objects of the invention are attained by the provision of a method that is characterized by the establishment of an internal steps per revolution ("ISPR") constant, and by the determination of a step scale conversion factor equal to the ISPR constant divided by the number of full steps per shaft revolution at which the motor is to operate, the ISPR constant necessarily being selected to constitute a whole number multiple of the number of full steps per shaft revolution value. Using the ISPR constant and the step scale conversion factor, the following sequence is repeated at each of a multiplicity of equal time intervals:

(a) detecting pulses newly input for operation of the stepper motor;

(b) multiplying the number of pulses newly input by the step scale conversion factor, to convert the pulses into new internal steps;

(c) adding the new internal steps to internal steps converted from pulses detected during previous time intervals, from commencement of operation of the motor, so as to establish a shaft position, at the desired final position, represented by the total of the new and the previous internal steps;

(d) determining, in terms of internal steps, a required shaft travel movement (distance and direction) based upon the current position and the final position of the motor shaft;

(e) dividing the so-determined required shaft travel movement by the step scale conversion factor; and (f) multiplying at least the whole number portion of the quotient of the division by an angle constant equal to 360° divided by the ISPR constant, thereby to define a command angle through which the shaft is to move.

Usually, only the whole number portion of the product of such division will be multiplied in step (f), with any fractional portion thereof being maintained, as a remainder of internal steps, for use in subsequent sequences.

The method will generally include, as a further step (g), determining effectively the torque necessary for movement of the motor shaft through the command angle. This may be done by calculating a control vector based upon the command angle, and determining the current and direction necessary to produce the required torque by reference to a look-up table in which torque values are correlated to control vector values, the look-up table comprising an array of index points representative of one electrical cycle of the motor and forming a sine-wave curve. Preferably, the method will allow non-sequential access to the index points of the look-up table if so dictated by the rate of input of new pulses.

Other objects of the invention are attained by the provision of a controller that implements the foregoing method, and that is comprised of electronic data processing means programmed for establishing the ISPR constant, for determining the step scale conversion factor, and for repeatedly carrying out the defined sequence of steps, all as herein before set forth. Additional objects are attained by the provision of a stepper motor system comprising a stepper motor and a controller operatively connected thereto, the controller having the features described. In the system embodiments the controller will usually additionally carry out, as further steps: determining effectively the torque necessary for movement of the motor shaft through the command angle, and generating a signal for applying to the motor the current necessary to produce such torque. In more specific embodiments of the system, the motor may be a two-phase hybrid stepper motor which operates at 200 full steps per revolution of the shaft, with the ISPR constant of the controller having a value of 40,000.

DETAILED DESCRIPTION OF THE PREFERRED AND ILLUSTRATED EMBODIMENT

Figure 1:
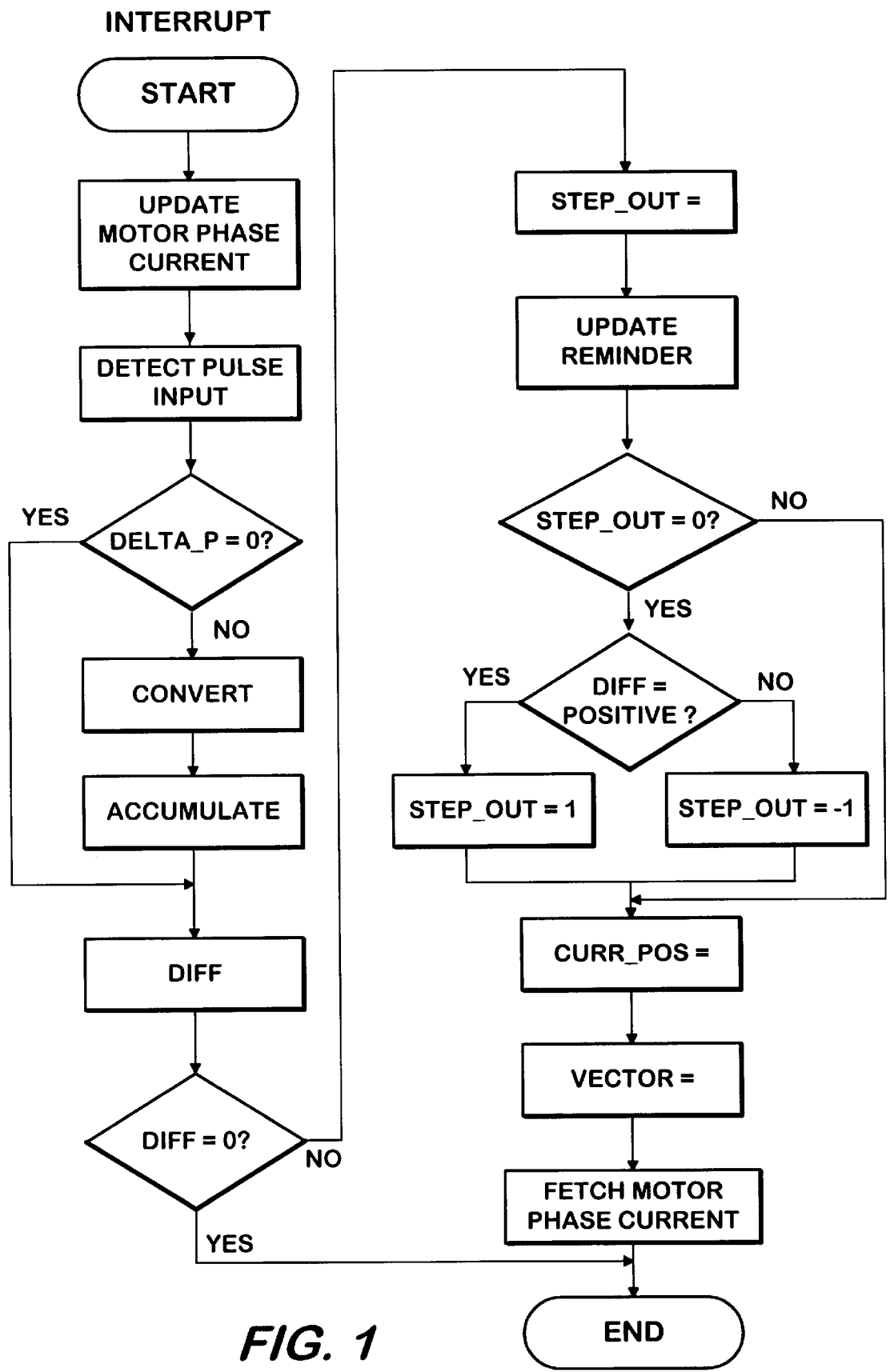
FIG. 1 is flow chart diagramming the operations carried out by the software embodying the controller of the invention.

Turning initially to FIG. 1 of the appended drawings, therein illustrated is the sequence of steps that are carried out by the controller for controlling rotation of a stepper motor shaft from its initial position, at the commencement of operation, to a desired final position. The sequence is repeated during each sample time interval, which interval will typically have a value of 55 microseconds but which may of course be selected to have any appropriate value. At the start of each interval (or at the end of the sequence carried out during the previous interval), the controller generates a motor torque command having a value that is established in the sequence completed during the preceding operating interval, to update the motor phase current from its existing value ("Update Motor phase current"). A pulse detector then accesses a pulse counter to determine if new pulses have been input into the system ("Detect pulse input"); it does so by comparing the present value of the pulse counter with its previous value, the difference being designated "ΔP" and being added to the previous value to update the counter. It will be appreciated that the pulse counter will, by convention, normally increase in value if the command direction for new pulses is clockwise and will decrease in value if the command direction is counterclockwise; thus, ΔP can be either a positive or a negative number.

In the event ΔP has a value other than zero ("Delta P=0?", "No"), the input pulses represented are converted to new internal steps ("Convert"). That is done by multiplying ΔP by the step scale conversion factor, the value of which equals the quotient of a selected ISPR constant (e.g., 40,000) divided by the number of full steps per shaft resolution at which the motor is to operate (e.g., 200). The calculated resultant number of new internal steps is then added ("Accumulate") in a final position register, which accumulates, in the form of internal steps, all of the pulses that are introduced into the controller from the time of commencement of operation; obviously, if ΔP equals zero ("Delta P=0", "Yes") the conversion and final position update steps are bypassed.

The number of internal steps that must then be processed ("DIFF") to attain the final shaft position is computed by subtracting the current position from the final position, expressed as internal steps. Needless to say, if DIFF is zero ("DIFF=0?", "Yes") the ultimate final position has been reached and further processing is unnecessary; the "End" point of the algorithm has been achieved and the controlled motor stops.

On the other hand, if DIFF has a value ("DIFF=0?", "No"), a new step angle change, to be impressed upon the motor, must be computed. To do so, any "remainder" (explained below) from sequences carried out during previous intervals of operation is added to the DIFF value. The sum is divided by the established step scale conversion factor, with the whole number portion of the quotient constituting the "step-out" for the current sequence ("Step-out="). The internal steps that constitute a fractional part of the quotient are taken as a remainder for the current interval and are added to the total number of internal steps representing remainders previously accumulated; the remainder register is updated accordingly ("Update Remainder").

If a step-out results from the present sequence ("Step-out=0?", "No"), its value is added for updating the current position ("Curr-pos=") as well as the current vector ("Vector=") registers. The resultant vector sum is utilized for obtaining the torque data that are required for generating the current (magnitude and direction) necessary for effecting rotation of the motor shaft so as to satisfy the input pulse train command just processed.

In the event that no step-out is produced during any given sample time interval (i.e., Step-out=0?", "Yes"), and a quantity of internal steps are contained in the remainder register, a forced, artificial step-out is generated and the register is cleared to zero. The value of the forced step-out will be ±1, depending upon whether the remainder has a positive or negative value ("DIFF=positive?", "Yes" or "No").

Although constituting a preferred embodiment, it should be appreciated that utilization of the remainder in the manner just described (i.e., by adding it to the DIFF value in the step-out calculation) is not essential to the method and apparatus of the invention. Fractional portions of the quotient resulting from the step-out calculation will of course be contained inherently in the DIFF value, albeit that smoothness and motor speed averaging will be maximized when remainders are added, as described.

Torque data are obtained by reference to an internal look-up table data base ("Fetch motor phase current"), which correlates direction and phase current information to vector values. The form of such a look-up table will depend upon the characteristics of the motor being controlled; typically however it will comprise an array of data values for one electrical cycle, in sine-wave form. In the embodiment specifically described, the table provides 800 torque value data points, with the torque value from two consecutive data points being that which will move the motor shaft through an angle of 0.009°. These parameters apply because (in this particular case) each commanded full pulse or step generates 200 internal steps, and each electrical commutation cycle requires four full steps.

As a specific example of torque data acquisition, if an existing vector value is 780 and a step-out of 12 results from the present sequence, the system will retrieve the required torque data at location 792 of the look-up table. If a step-out of 12 were again to be added, the indicated location (804) would exceed the table size (800) and a wrap-around function would occur, such that the torque information would be obtained from location 4 of the table (i.e., only vector values in the range 0–799 are provided for).

Figure 2:
FIG. 2 is a block diagram showing the functional components of the controller.

FIG. 2 shows the basic functional components of the software by which the sequence of control operations herein described are implemented. More particularly, the Pulse convertor receives an input (e.g., a full-step or half-step pulse train) from the Pulse detector, which determines from an up/down counter the difference ($\Delta P$) between the number of pulses previously and currently sampled. The value $\Delta P$ is fed to the Pulse converter, and is multiplied by the step scale conversion factor. The product is added to the current content of the Accumulator to define the final shaft position or destination (expressed as internal steps). That total is supplied to the Pulse distributor, wherein the difference between the final position and the current (present) position is calculated, and is divided by the step scale conversion factor.

Whole number values (step-out) that result from this calculation are used to Update the control vector register, as well as a current position ("Curr-position") register, for tracking. As previously explained, if there is a remainder following the division those internal steps of which the remainder is constituted are added to any remainders from prior sequences, and are taken into account during subsequent cycles. At such time as no step-out is generated, but a remainder of internal steps exists, then an artificial, or forced, step-out is generated having a value of plus or minus unity (depending upon the sign of the remaining internal steps).

The control vector is calculated incrementally based upon the change in output step angle (command angle) obtained from the Pulse distributor. The control vector value is used to fetch the motor phase currents and direction information from a look-up table stored in memory; the control vector is bounded by the size of the look-up table.

Figure 3:
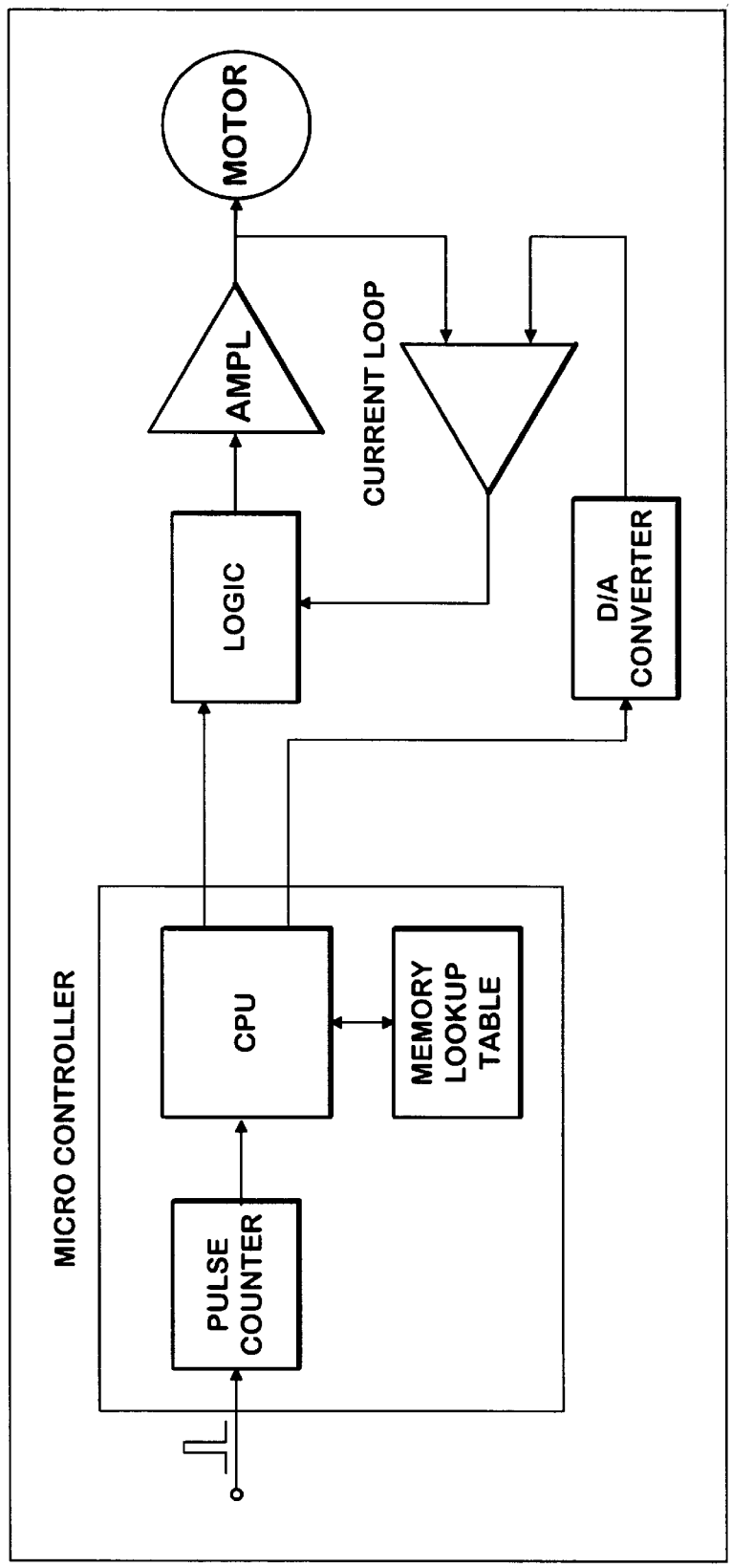
FIG. 3 is a diagrammatic illustration of a system embodying the invention.

As can be seen from FIG. 3, the central processing unit (CPU), pulse counter, and memory look-up table constitute a microcontroller for the system. Signals from the CPU are transmitted to logic circuitry and to a digital/analog converter, and the signal from the logic circuit is amplified and transmitted to the stepper motor. A feed-back current loop is summed with a signal from the digital/analog converter for input to the logic circuit in a conventional manner.

The instant step motor drive control methodology enables, most advantageously, full step or half step operation of a stepper motor in such manner as to produce a very low vibration characteristic approaching that of high-resolution microstep drive methods, and thereby eliminates the need for high frequency input pulse trains (and microstep drivers) in systems of the kind described. The instant method also greatly reduces resonant effects at all speeds, and it does so to an extent that has not heretofore been possible with conventional full/half step drivers.

The control method is implemented as a software algorithm applied to a microcontroller-based hardware platform. Although the controller described may accept step input commands at microstep rates, the following specific description is based upon a full-step input pulse rate, in which mode the invention affords the greatest benefit.

As discussed above, upon receiving input pulses the control converts them to internal steps, and ultimately calculates the intermediate incremental step angle that should be applied to the motor, for a given fixed time interval, so as to achieve the indicated final position. The intermediate step angle is a variable that depends upon the rate at which input pulses are received; thus, it is unique as compared to conventional microstep drive methods, wherein a fixed angle increment is generated for each input pulse. The stepper motor employed is commutated using a sine wave current drive method that is similar to that which is employed with a standard microstep driver, with the exception that the output sine wave has index points that vary, per cycle, as a function of input pulse speed.

By choosing an arbitrary step angle value of 0.009° as the conversion base (i.e., for converting input pulses to internal steps) for a two-phase motor having a 1.8° full step character, there will be 200 imaginary microsteps for each full step pulse received (or similarly, 100 imaginary microsteps for each half step pulse), and of course the ISPR constant will be 40,000 (360°/0.009°). Needless to say, if a value of, for example, 0.0036° were selected as the step angle conversion base, then the ISPR constant would have a value of 100,000. The controller algorithm keeps track of total input pulses registered at each sampling time interval, converts them, and accumulates total pulses in the form of the internal steps; the output variable step angle is then computed so as to satisfy the speed command. It will be appreciated that the output step angle increases as the commanded pulse rate increases, and that (for the case in which the step angle conversion base is 0.009°) it can have any value in the range zero to 1.8° (i.e., 200 times the 0.009° conversion base). The ultimate stopping position is attained when no internal pulses remain in the accumulator.

Thus, it can be seen that the present invention provides a novel method for controlling, with a high degree of precision, rotation of a stepper motor shaft, as well as novel controller and motor system for implementing the same. The method and apparatus enable the use of relatively low frequency operating pulse trains, avoid the need for a microstep driver, and afford relatively brief settling times between step transitions. More specifically, the invention makes available a method, controller, and system that are especially effective for optimizing low-speed performance of stepper motors, and it does so at relatively low cost.

Having thus described the invention, what is claimed is:

1. A method for controlling rotation of a stepper motor shaft from its position at the commencement of operation to a desired final position, comprising: establishing, as a constant, an internal steps per revolution value, and determining a conversion factor equal to said internal steps per revolution value divided by the number of full steps per shaft revolution at which the motor is to operate, said internal steps per revolution value being a whole number multiple of the number of steps per shaft revolution at which the motor is to operate; and repeating the following sequence at each of a multiplicity of equal time intervals:

(a) detecting pulses newly input for operation of the stepper motor;

(b) multiplying the number of said pulses newly input by said conversion factor, to convert said pulses into new internal steps;

(c) adding said new internal steps to internal steps converted from pulses detected during previous time intervals, from commencement of operation, so as to establish a final shaft position represented by the total of said new and previous internal steps;

(d) determining, in terms of internal steps, a required shaft travel movement based upon the present position and the final position of the motor shaft;

(e) dividing said required shaft travel movement by said conversion factor; and (f) multiplying at least the whole number portion of the quotient of said division by an angle constant equal to 360° divided by said internal steps per revolution value, thereby to define a command angle through which the shaft is to move.

2. The method of claim 1 wherein only the whole number portion of said quotient is multiplied in said step (f), any fractional portion of said quotient being maintained as a remainder of internal steps for use in determining a forced command angle in a subsequent one of said sequences.

3. The method of claim 1 wherein only the whole number portion of said quotient is multiplied in said step (f), with any fractional portion of said quotient constituting a remainder of internal steps, and wherein said remainder is added to the value of said required shaft travel movement determined in said step (d), and divided together therewith in said step (e).

4. The method of claim 1 including, as a further step (g), determining effectively the torque necessary to effect movement of the motor shaft at through command angle.

5. The method of claim 4 wherein a present control vector value is calculated based upon said command angle, and wherein the current and direction information necessary to produce said torque are determined with reference to a look-up table in which torque values are correlated to control vector values.

6. The method of claim 5 wherein said look-up table comprises an array of index points representative of one electrical cycle of the motor and forming a sine-wave curve.

7. The method of claim 6 wherein control vector values calculated from said previous time intervals are accumulated and added to said present control vector value, and wherein the sum of the previous vector values and said present vector values is used to obtain said current and direction information from said look-up table.

8. The method of claim 7 wherein said index points of said look-up table are accessed non-sequentially if so dictated by the rate of input of said newly input pulses.

9. A controller for controlling rotation of a stepper motor shaft from its position at the commencement of operation to a desired final position, said controller comprising electronic data processing means programmed for establishing, as a constant, an internal steps per revolution value, and determining a conversion factor equal to said internal steps per revolution value divided by the number of full steps per shaft revolution at which the motor is to operate, said internal steps per revolution value being a whole number multiple of the number of steps per shaft revolution at which the motor is to operate, and for repeating the following sequence at each of a multiplicity of equal time intervals:

(a) detecting pulses newly input for operation of the stepper motor;

(b) multiplying the number of said pulses newly input by said conversion factor, to convert said pulses into new internal steps;

(c) adding said new internal steps to internal steps converted from pulses detected during previous time intervals, from commencement of operation, so as to establish a final shaft position represented by the total of said new and previous internal steps;

(d) determining, in terms of internal steps, a required shaft travel movement based upon the present position and the final position of the motor shaft;

(e) dividing said required shaft travel movement by said conversion factor; and (f) multiplying at least the whole number portion of the quotient of said division by an angle constant equal to 360° divided by said internal steps per revolution value, thereby to define a command angle for movement of the shaft.

10. The controller of claim 9 wherein only the whole number portion of said quotient is multiplied in said step (f), any fractional portion of said quotient being maintained as a remainder of internal steps for use in determining a forced command angle in a subsequent one of said sequences.

11. The controller of claim 9 wherein only the whole number portion of said quotient is multiplied in said step (f), with any fractional portion of said quotient constituting a remainder of internal steps, and wherein said remainder is added to the value of said required shaft travel movement determined in said step (d), and divided together therewith in said step (e).

12. The controller of claim 9 programmed to include, as a further step (g), determining effectively the torque necessary to effect movement of the motor shaft through said command angle.

13. The controller of claim 12 wherein said controller is programmed to calculate a present control vector value based upon said command angle, and wherein said controller includes a look-up table data base in which torque values are correlated to control vector values and with reference to which the current and direction information necessary to produce said torque can be determined.

14. The controller of claim 13 wherein control vector values calculated from said previous time intervals are accumulated and added to said present control vector value, and wherein the sum of the previous vector values and said present vector value is used to obtain said current and direction information form said look-up table.

15. The controller of claim 13 wherein said look-up table comprises an array of index points representative of one electrical cycle of the motor and forms a sine-wave curve.

16. The controller of claim 15 wherein said index points of said look-up table are accessed non-sequentially if so dictated by the rate of input of said newly input pulses.

17. A stepper motor system comprising a stepper motor and a controller operatively connected thereto, said controller controlling rotation of the shaft of said motor from its position at the commencement of operation to a desired final position, and comprising electronic data processing means programmed for establishing, as a constant, an internal steps per revolution value, for determining a conversion factor equal to said internal steps per revolution value divided by the number of full steps per shaft revolution at which said motor operates, said internal steps per revolution value being a whole number multiple of said number of steps per shaft revolution, and for repeating the following sequence at each of a multiplicity of equal time intervals:

(a) detecting pulses newly input for operation of said stepper motor;

(b) multiplying the number of said pulses newly input by said conversion factor, to convert said pulses into new internal steps;

(c) adding said new internal steps to internal steps converted from pulses detected during previous time intervals, from commencement of operation, so as to establish a final shaft position represented by the total of said new and previous internal steps;

(d) determining, in terms of internal steps, a required shaft travel movement based upon the present position and the final position of said motor shaft;

(e) dividing said required shaft travel movement by said conversion factor;

(f) multiplying at least the whole number portion of the quotient of said division by an angle constant equal to 360° divided by said internal steps per revolution value, thereby to define a command angle for movement of said shaft;

(g) determining effectively the torque necessary to effect movement of the motor shaft through command angle; and (h) generating a signal for applying to said motor the current necessary to produce such torque.

18. The system of claim 17 wherein only the whole number portion of said quotient is multiplied in said step (f), any fractional portion of said quotient being maintained as a remainder of internal steps for use in determining a forced command angle in a subsequent one of said sequences.

19. The system of claim 17 wherein only the whole number portion of said quotient is multiplied in said step (f), with any fractional portion of said quotient constituting a remainder of internal steps, and wherein said remainder is added to the value of said required shaft travel movement determined in said step (d), and divided together therewith in said step (e).

20. The system of claim 17 wherein said controller is programmed to calculate a present control vector value based upon said command angle, and wherein said controller includes a look-up table data base in which torque values are correlated to control vector values and with reference to which the current and direction information necessary to produce said torque can be determined.

21. The system of claim 20 wherein said look-up table comprises an array of index points representative of one electrical cycle of the motor and forms a sine-wave curve.

22. The system of claim 21 wherein control vector values calculated from said previous time intervals are accumulated and added to said present control vector value, and wherein the sum of the previous vector values and said present vector value is used to obtain said current and direction information from said look-up table.

23. The system of claim 22 wherein said index points of said look-up table are accessed non-sequentially if so dictated by the rate of input of said newly input pulses.

24. The system of claim 17 wherein said motor is a two-phase hybrid stepper motor.

25. The system of claim 24 wherein said motor operates at 200 full steps per revolution of said shaft, and wherein said internal steps per revolution constant has a value of 40,000.

* * * * *

UNITED STATES PATENT AND TRADEMARK OFFICE
CERTIFICATE OF CORRECTION

PATENT NO. : 5,844,393
DATED      : December 1, 1998
INVENTOR   : Hung D. Vu

It is certified that error appears in the above-indentified patent and that said Letters Patent is hereby corrected as shown below:

On the cover page, insert after the inventor identification -- [73] Assignee: Seiberco Incorporated, Braintree, Mass. --

Signed and Sealed this

Twenty-fifth Day of May, 1999

Attest:

Q. TODD DICKINSON

Attesting Officer     Acting Commissioner of Patents and Trademarks